United States Patent
Jeong et al.

(10) Patent No.: US 9,065,138 B2
(45) Date of Patent: Jun. 23, 2015

(54) WATER SOLUBLE BINDER COMPOSITION, METHOD OF PRODUCING THE SAME AND ELECTRODE FOR RECHARGEABLE BATTERY EMPLOYING THE SAME

(71) Applicant: Samsung SDI Co., Ltd., Yongin, Gyeonggi-Do (KR)

(72) Inventors: Hyesun Jeong, Yongin (KR); Beomwook Lee, Yongin (KR); Hyeran Lee, Yongin (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 113 days.

(21) Appl. No.: 13/797,822

(22) Filed: Mar. 12, 2013

(65) Prior Publication Data
US 2013/0273423 A1    Oct. 17, 2013

(30) Foreign Application Priority Data
Apr. 16, 2012    (KR) .................. 10-2012-0039421

(51) Int. Cl.
*H01M 4/62*    (2006.01)
*H01M 4/02*    (2006.01)

(52) U.S. Cl.
CPC .............. *H01M 4/622* (2013.01); *H01M 4/621* (2013.01); *H01M 4/02* (2013.01)

(58) Field of Classification Search
CPC ........ H01M 4/621; H01M 4/622; H01M 4/02
USPC .................. 429/217, 206, 231, 144; 252/511; 528/332, 353
See application file for complete search history.

(56) References Cited

U.S. PATENT DOCUMENTS

| | | | |
|---|---|---|---|
| 5,525,444 A * | 6/1996 | Ito et al. ................. | 429/206 |
| 6,399,246 B1 * | 6/2002 | Vandayburg et al. ...... | 429/217 |
| 2005/0266305 A1 * | 12/2005 | Ohata et al. ............. | 429/144 |
| 2011/0117431 A1 | 5/2011 | Fukui et al. | |
| 2011/0143206 A1 * | 6/2011 | Muthu et al. ............. | 429/231 |

FOREIGN PATENT DOCUMENTS

JP    2011-048921 A    3/2011
KR    10-2011-0029087 A    3/2011

* cited by examiner

*Primary Examiner* — Kenneth Douyette
(74) *Attorney, Agent, or Firm* — Knobbe Martens Olson & Bear LLP

(57) ABSTRACT

In one aspect, a water soluble binder composition, a method of producing the same and an electrode for a rechargeable battery employing the same is provided.

11 Claims, 1 Drawing Sheet

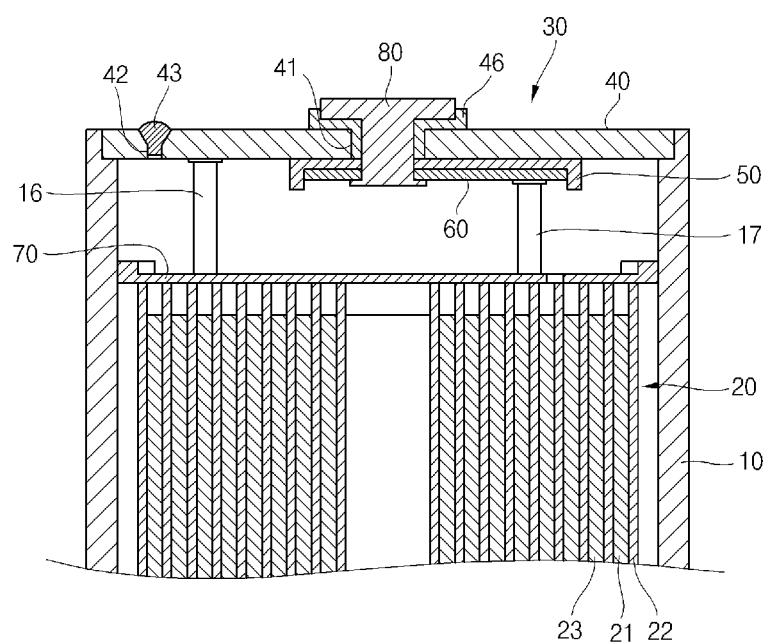

WATER SOLUBLE BINDER COMPOSITION, METHOD OF PRODUCING THE SAME AND ELECTRODE FOR RECHARGEABLE BATTERY EMPLOYING THE SAME

CROSS-REFERENCE TO RELATED APPLICATION

This application claims the benefit of Korean Patent Application No. 10-2012-0039421 filed on Apr. 16, 2012, in the Korean Intellectual Property Office, the disclosure of which is incorporated herein in its entirety by reference.

BACKGROUND

1. Field

One or more embodiments relate to a water soluble binder composition, a method of producing the same and an electrode for a rechargeable battery employing the same.

2. Description of the Related Technology

Rechargeable batteries having large capacity and cycle life characteristics are in demand to include in smaller, lighter, and higher performance portable devices.

To satisfy the demand, development of materials and methods is under way for achieving high capacity by forming high-capacity active material of a positive electrode, increasing an electrode slurry density and increasing a thickness of the electrode. In addition, active research is being made into method for replacing existing active materials for a negative electrode, such as graphite-based material, with materials capable of achieving high capacity of a negative electrode, such as silicon, a silicon and silicon oxide composite, a silicon and graphite composite, tins, or alloys thereof. Some rechargeable battery products using a small amount of the silicon-silicon oxide composite are commercially available.

In order to improve high-capacity, cycle life and stability characteristics, materials for forming a rechargeable battery, such as an electrolyte, a separator, or a binder, other than the positive and negative electrode materials, is under development.

For example, a binder composition using a polymer binder composition converted into polyimide during a drying step has proposed. However, since the binder composition is dissolved in an organic solvent to be used, it is not environmentally friendly and cannot be directly applied to water-based processes currently employed in negative electrode production lines.

SUMMARY

Some embodiments provide a water soluble binder composition, a rechargeable battery employing the same and a method of producing the same. In certain embodiments, the binder composition can improve a life cycle characteristic by preventing an electrode from being deformed even during expansion or shrinkage of an active material by imparting high binding capacity with regard to a current collector and the active material and excellent electrochemical stability to a positive electrode. In certain embodiments, the binder composition can impart high binding capacity with regard to a current collector and the active material. In certain embodiments, the binder composition can impart high tensile strength to a negative electrode. For example, the binder composition can solve problems associated with a conventional binder that may be environmentally unfriendly.

Some embodiments provide an electrode for a rechargeable battery and a rechargeable battery employing the same, which are environmentally friendly and have an excellent cycle life characteristic.

Some embodiments provide a water soluble binder composition of an electrode for a rechargeable battery, the water soluble binder composition comprising a polymer binder having at least one amide group and at least one carboxylate group in a repeated unit of polymer.

Some embodiments provide a method of producing a water soluble binder composition for an electrode, the method including preparing an organic solvent type polymer binder including having at least one amide group and at least one carboxylate group in a repeated unit of polymer by performing condensation polymerization on one or more diamines having an acid component and an amine group at its both terminals, and converting the carboxyl group into a carboxylate group.

In certain embodiments, the acid component may be at least one selected from the group consisting of (a) dicarboxylic acid, (b) acid dianhydride, and (c) tricarboxylic anhydride or chloride.

In certain embodiments, the ratio of the acid components is not particularly limited when at least two or more of the acid component are used in combination. In certain embodiments, the amide group and the carboxylate group are preferably contained in the binder in a ratio of 8:2 to 1:9. In certain embodiments, the ratio may be maintained to allow enough carboxyl groups to be soluble in water even after being converted into the carboxylate groups.

The tricarboxylic anhydride may be a compound having a carboxylic group and an anhydride, and the tricarboxylic chloride may be a compound having a carboxylic group and an acyl chloride group.

Some embodiments provide a lithium rechargeable battery comprising a positive electrode, a negative electrode, a separator, and an electrolyte, wherein at least one of the positive electrode and the negative electrode is an electrode manufactured as disclosed and described herein.

In certain embodiments, the water soluble binder composition for a rechargeable battery may include a polymer binder having at least one amide group and at least one carboxylate group in a repeated unit of polymer to impart high binding capacity with regard to a current collector and the active material and excellent electrochemical stability to a positive electrode and to impart high binding capacity with regard to a current collector and the active material and a high tensile strength to a negative electrode, thereby improving a cycle life characteristic by preventing an electrode from being deformed even during expansion or shrinkage of the active material, while solving problems with the conventional binder that is environmentally unfriendly.

Additional aspects and/or advantages of the present embodiments will be set forth in part in the description which follows and in part will be understood from the description or may be understood by practice of the embodiments.

BRIEF DESCRIPTION OF THE DRAWING

The accompanying drawings are included to provide further understanding of the present disclosure, and are incorporated in and constitute a part of this specification. The drawings illustrate certain embodiments of the present disclosure and, together with the description, serve to explain principles of the present disclosure, in which:

FIG. 1 is a partially cross-sectional view of a lithium rechargeable battery according to an embodiment

DETAILED DESCRIPTION

Hereinafter, exemplary embodiments will be described in detail and may include reference to the accompanying drawing such that they can easily be made and used by those skilled in the art.

In certain embodiments, the water soluble binder composition may include a polymer binder having at least one amide group and at least one carboxylate group in a repeated unit of polymer.

Water Soluble Binder Composition for Electrode

In certain embodiments, the water soluble binder composition may include in a repeated unit of polymer at least one type of moiety selected from the group consisting of amide groups and carboxylate groups. For example, the water soluble binder composition may including an amide moiety and a carboxylate moiety as a polymer repeated unit, as represented by Formula 1, a structure including a carboxylate group as a polymer repeated unit, as represented by Formulas 1 and 2, or a structure including an amide group as a polymer repeated unit, as represented by Formulas 1, 2 and 3:

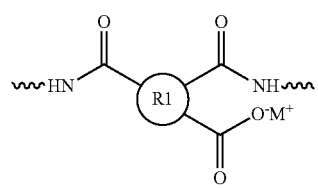

Formula 1

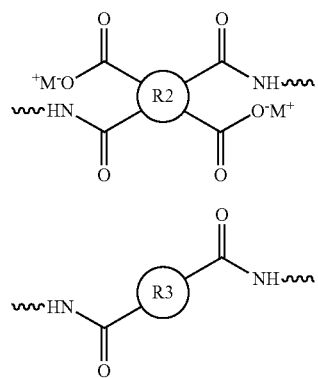

Formula 2

Formula 3 wherein R1, R2 and R3 are a core that may be di-, tri-, or tetra-substituted as appropriate. R1, R2 and R3 are a core that may be di-, tri-, or tetra-substituted as determined by the structure of a precursor compound used when condensation polymerization is performed.

In certain embodiments, R1 may be an aliphatic compound. In certain embodiments, R1 may include an aromatic ring and may include a heteroatom such as oxygen, sulfur or nitrogen provided within the aromatic ring or between aromatic rings. In certain embodiments, R1 may include a C6-C50 aromatic ring may include a heteroatom such as oxygen, sulfur or nitrogen provided within the aromatic ring or between aromatic rings. In certain embodiments, R1 may include a benzene ring.

In certain embodiments, R1 may be a structures having a phenyl ring or naphthyl ring such as

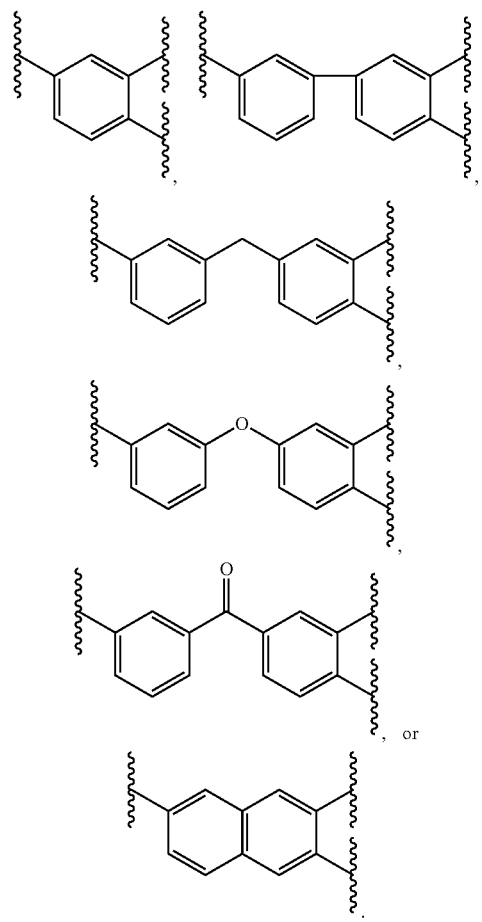

In certain embodiments, the water soluble binder composition may include at least one of:

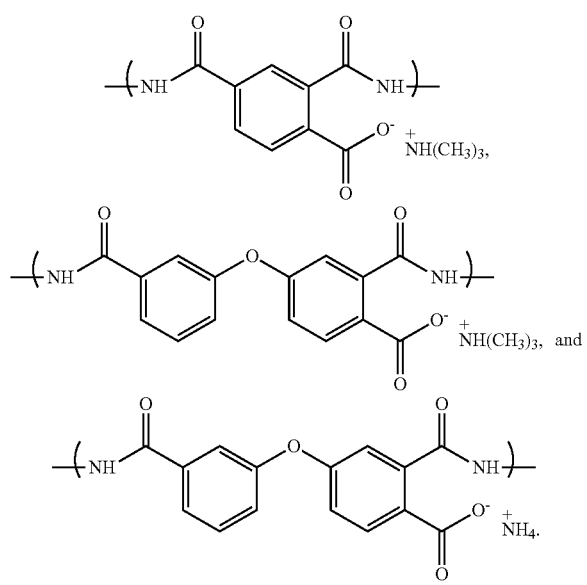

In certain embodiments, R2 may be an aliphatic compound. In certain embodiments, R2 may include an aromatic ring and may be substituted or unsubstituted by halogen atom.

In certain embodiments, R2 may be exemplified by at least one structures having a phenyl ring or naphthyl ring such as

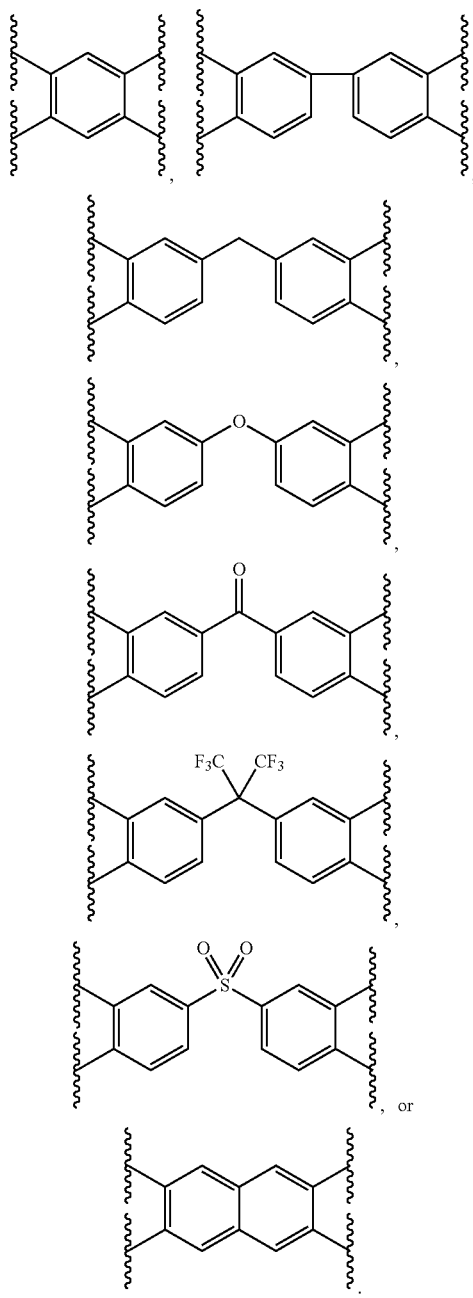

In certain embodiments, the water soluble binder composition may include at least one of:

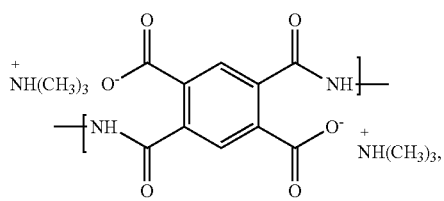

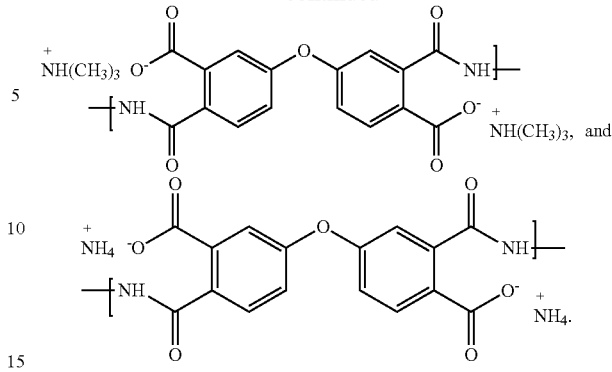

In certain embodiments, M may be a component capable of forming a salt with dicarboxylic acid, such as an alkaline metal, an alkaline earth metal or a protonated amine compound. In certain embodiments, the alkaline metal may be lithium (Li), sodium (Na), or potassium (K); the alkaline earth metal may be magnesium (Mg) or calcium (Ca); and the amine compound may be at least one primary, secondary or tertiary amine compound selected from the group consisting of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine and triethanolamine.

In certain embodiments, R3 may be at least one of a linear or branched C1-C12 saturated or unsaturated hydrocarbon, carbonyl (—CO—), oxy (—O—), carbonyloxy (—COO— or —OCO—), aminocarbonyl (—NH₂—CO— or —CO—NH₂—), aminosulfonyl (—NH₂—SO₂— or —SO₂—NH₂—), sulfanyl(—S—), sulfinyl (—S(O)—), sulfonyl (—SO₂—), sulfonyloxy (—SO₂—O— or —O—SO₂—), or imino (—NH—). In certain embodiments, the water soluble binder composition may include at least one of:

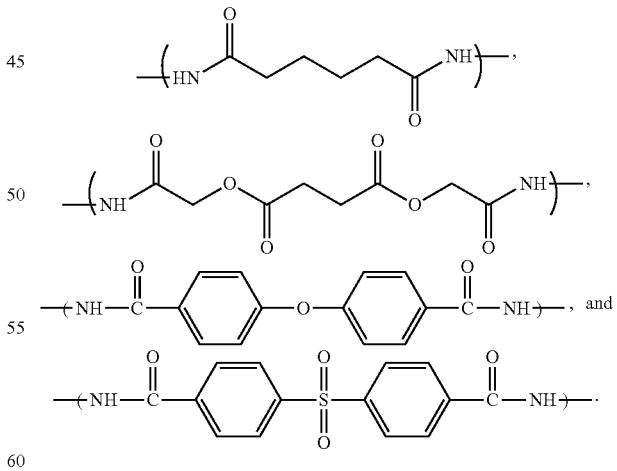

In certain embodiments, the average weight molecular weight of the binder according to the present embodiments may be in a range of 2,000 to 1,000,000 g/mol. In certain embodiments, the average weight molecular weight of the binder may be 10,000 to 500,000 g/mole. If the average weight molecular weight of the binder deviates from the range stated above, the binder may not properly serve as a binder, deteriorating dispersing and coating properties of slurry.

In certain embodiments, a polymer binder may be used alone when the water soluble polymer binder composition is used in forming an electrode. In certain embodiments, two or more kinds of polymer binders or one kind of polymer binder having different molecular weights may be used in combination.

Preparation of Water Soluble Binder Composition

In certain embodiments, the water soluble polymer binder may be produced by first preparing an organic solvent soluble type polymer having at least one amide group and at least one carboxylate group in a repeated unit of polymer, and forming a carboxylate group from the carboxyl group.

Preparation of Organic Solvent Type Polymer

In certain embodiments, the organic solvent type polymer may be prepared by treating one or more diamines having an amine group at both terminals with at least one acid component of (a) dicarboxylic acid, (b) acid dianhydride, and (c) tricarboxylic anhydride or chloride.

Examples of the dicarboxylic acid (a) having carboxyl groups at its both terminals may include, but are not limited to, oxalic acid, adipic acid, molonic acid, sebacic acid, azelaic acid; aliphatic dicarboxylic acid such as dodecanedicarboxylic acid, dicarboxypolybutadiene, dicarboxypoly(acrylonitrile-butadiene) or dicarboxypoly(styrene-butadiene); alicyclic dicarboxylic acid such as 1,4-cyclohexanedicarboxylic acid, 1,3-cyclohexanedicarboxylic acid, 4,4'-dicyclohexylmethanedicarboxylic acid or dimeric acid; and aromatic dicarboxylic acid such as terephthalic acid, isophthalic acid, diphenylsulfonedicarboxylic acid, diphenyletherdicarboxylic acid, or naphthalenedicarboxylic acid.

Examples of the acid dianhydride (b) may include, but are not limited to, at least one selected from the group consisting of aliphatic dianhydrides such as 1,2,3,4-cyclobutane tetracarboxylic acid dianhydride, 1,2,3,4-cyclopentane tetracarboxylic acid dianhydride, or 5-(2,5-dioxotetrahydrofuryl)-3-methylcyclohexane-1,2-dicarboxylic acid anhydride; alkylene glycol bisanhydrotrimelitates such as trimelitic acid anhydride, pyromelitic acid dianhydride, ethylene glycolbisanhydrotrimelitate, propylene glycolbisanhydrotrimelitate, 1,4-butanediolbisanhydrotrimelitate, hexamethylene glycolbisanhydrotrimelitate, polyethylene glycolbisanhydrotrimelitate, or polypropylene glycolbisanhydrotrimelitate; aromatic acid dianhydride compounds such as 3,3',4,4'-benzophenone tetracarboxylic acid dianhydride, 3,3',4,4'-biphenyltetracarboxylic acid dianhydride, 1,2,5,6-naphthalenetetracarboxylic acid dianhydride, 1,4,5,8-naphthalenetetracarboxylic acid dianhydride, 2,3,5,6-pyridinetetracarboxylic acid dianhydride, 3,4,9,10-perylenetetracarboxylic acid dianhydride, 3,3',4,4'-diphenylsulfonetetracarboxylic acid dianhydride, m-terphenyl-3,3',4,4'-tetracarboxylic dianhydride, 4,4'-oxydiphthalic dianhydride, 1,1,1,3,3,3-hexafluoro-2,2-bis(2,3- or 3,4-dicarboxyphenyl)propane dianhydride, 2,2-bis(2,3- or 3,4-dicarboxyphenyl)propane dianhydride, 2,2-bis[4-(2,3- or 3,4-dicarboxyphenoxy)phenyl]propane dianhydride, 1,1,1,3,3,3-hexafluoro-2,2-bis[4-(2,3- or 3,4-dicarboxyphenoxy)phenyl]propane dianhydride, or 1,3-bis(3,4-dicarboxyphenyl)-1,1,3,3-tetramethyldisiloxane dianhydride; and combinations of aromatic and aliphatic dianhydride compounds.

Examples of the tricarboxylic acid anhydrides or chlorides (c) may include, but are not limited to, anhydrides or chlorides of saturated aliphatic tricarboxylic acid, such as 1,2,3-propanetricarboxylic acid, 1-methyl-1,2,3-propanetricarboxylic acid, 2-methyl-1,2,3-propanetricarboxylic acid, 1-ethyl-1,2,3-propanetricarboxylic acid, 1,2,4-butanetricarboxylic acid, 1,3,5-pentanetricarboxylic acid, or 1,2,5-hexanetricarboxylic acid; anhydrides or chlorides of saturated alicyclic tricarboxylic acid, such as 1,2,4-cyclopentanetricarboxylic acid, 1,2,3-cyclohexanetricarboxylic acid, 4-methyl-1,2,3-cyclohexanetricarboxylic acid, 1,2,4-cyclohexanetricarboxylic acid, 6-methyl-1,2,4-cyclohexanetricarboxylic acid, 1,3,5-cyclohexanetricarboxylic acid, 1,2,4-decahydronaphthalenetricarboxylic acid, or 1,2,5-decahydronaphthalenetricarboxylic acid; and anhydrides or chlorides of aromatic tricarboxylic acid, such as trimelitic acid, trimesic acid, 1,2,3-benzenetridicarboxylic acid, 1,2,4-naphthalenetricarboxylic acid, 1,2,5-naphthalenetricarboxylic acid, 1,4,5-naphthalenetricarboxylic acid, 2,3,6-naphthalenetricarboxylic acid, or 1,3,6-naphthalenetricarboxylic acid.

In certain embodiments, the anhydrides or chlorides of the tricarboxylic acid may be trimelitic acid anhydride or trimelitic acid chloride. In certain embodiments, the acid chloride of the tricarboxylic acid may be trimelitic acid chloride.

Examples of the diamine compound may include at least one selected from the group consisting of aliphatic diamine compounds such as ethylenediamine, propanediamine, 1,4-butanediamine, 1,6-hexanediamine, 1,7-heptanediamine, 1,8-octanediamine, 1,10-decanediamine, 1,11-undecanediamine, 1,12-dodecanediamine, 3-methyl-1,5-pentanediamine, 2,2,4-trimethyl-1,6-hexanediamine, 2,4,4-trimethyl-1,6-hexanediamine, or 5-methyl-1,9-nonanediamine; and aromatic diamine compounds such as para-phenylenediamine, meth-phenylenediamine, 4,4'-oxydianiline, 4,4'-methylenedianiline, 4,4'-diaminobezanilide, 3,5-diaminobenzoic acid, 2,2'-bis(4-aminophenyl)hexafluoropropane, methbisaminophenoxydiphenylsulfone, parabisaminophenoxydiphenylsulfone, 1,4-bisaminophenoxybenzene, 1,3-bisaminophenoxybenzene, 2,2'-bisaminophenoxyphenylpropane, or 2,2'-bisaminophenoxyphenylhexafluoropropane.

In certain embodiments, the dicarboxylic acid (a), acid dianhydride (b), or tricarboxylic acid anhydride or chloride (c) and the diamine compound may be an aliphatic type, an aromatic type, or a combination of aliphatic and aromatic types.

In certain embodiments, the condensation polymerization may be performed using an organic solvent. In certain embodiments, the organic solvent may include at least one component selected from the group consisting of m-cresol, N-methyl-2-pyrrolidone (NMP), dimethylformamide (DMF), dimethylacetamide (DMAc), γ-butyrolactone, 2-butoxyethanol and 2-ethoxyethanol.

Converting Organic Solvent Type Polymer Binder into Water Soluble Polymer Binder In certain embodiments, the organic solvent type polymer binder may be converted into a water soluble polymer binder by treating a carboxyl group of the organic solvent type polymer binder with a reagent to afford a carboxylate group.

In certain embodiments, the reagent for converting a carboxyl group into a carboxylate group comprises one or more compounds selected from the group consisting of an amine compound, a metal hydroxide compound and a metal carbonate.

In certain embodiments, the water soluble polymer binder may be formed by standard methods or by methods a disclosed and described herein. For example: first method, an organic solvent type polymer binder dissolved in an organic solvent is precipitated in water, petroleum ether, diethylether, low alcohol or ethylacetate, and then subjected to filtering, washing and drying to produce the polymer binder in form of powder. The powder is added to water having an appropriate amount of a water soluble amine compound, a metal hydroxide compound or a metal carbonate compound dissolved therein and then stirred for an appropriate duration of time to change a dicarboxylic acid group in the organic soluble polymer binder into a carboxylate group, thereby preparing water soluble polymer binder dissolved in water.

For example: second method, an appropriate amount of the organic solvent type amine compound, the metalhydroxide compound, or the metal carbonate compound is added to the organic soluble polymer binder dissolved in the organic solvent. A mixture is stirred for an appropriate duration of time to form the carboxyl group in the organic soluble polymer binder into an amine salt or a metal salt. The stirred solution is precipitated in petroleum ether, ethylether, acetone, low alcohol or ethylacetate to then be subjected to filtering, washing and drying to produce water soluble polymer binder powder. The thus produced water soluble polymer binder powder may be dissolved in an appropriate amount of water to then be used.

The first method is advantageous in that it can be directly applied to the water soluble polymer binder preparation process because an aqueous solution of polymer binder dissolved in water can be prepared. However, the water soluble polymer binder may be denatured when it is stored in an aqueous state for an extended period of time. By contrast, the second method is advantageous in that the water soluble polymer binder is produced in the form of powder and is stable even after it is stored for an extended period of time. However, the second method is disadvantageous because the water soluble polymer binder powder will be dissolved in water to be used.

Examples of the metal hydroxide compound may include at least one selected from the group consisting of lithium hydroxide, sodium hydroxide, potassium hydroxide, magnesium hydroxide, and calcium hydroxide.

Examples of the metal carbonate compound include at least one selected from the group consisting of lithium carbonate, sodium carbonate, potassium carbonate, magnesium carbonate, and calcium carbonate.

In certain embodiments, the water soluble amine compound may include at least one component selected from the group consisting of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, and tetraethylammonium hydroxide.

In certain embodiments, the amine compound may include at least one amine compound selected from tripentylamine, dibutylamine, dihexylamine, dicyclohexylamine, aniline and pyridine.

Auxiliary Binder

In certain embodiments, the polymer binder may be used alone when the water soluble polymer binder composition is used in forming an electrode. However, in order to improve additional characteristics, including dispersing capability of active material, binding capacity between active material and a current collector, elasticity, and so on, the water soluble polymer binder composition according to the present invention may include additional auxiliary water soluble binders in combination with the water soluble polymer binder.

In certain embodiments, the water soluble polymer binder may be present in an amount of 50 to 100 wt %, based on a total weight of the binder composition. In certain embodiments, the water soluble polymer binder may be present in an amount of 70 to 100 wt %, based on a total weight of the binder composition. If the amount of the water soluble polymer binder is less than 50 wt %, desired characteristics may not be attained.

In certain embodiments, the binder used in combination with the water soluble polymer binder may be in a water-based type, such as a binder dissolved or dispersed in water.

Examples of the auxiliary binder used in combination may include at least one component selected from the group consisting of polyvinyl alcohol, polyacrylic acid, polymethacrylic acid, polyacrylic acid copolymer, polymethacrylic acid copolymer, polyacrylamide, polyacrylamide copolymer, (modified) butadiene-based rubber emulsion, (modified) styrene-butadiene-based rubber emulsion, and (modified) urethane-based rubber emulsion.

In certain embodiments, only a small amount of the auxiliary binder required may be used because most of the auxiliary binder is pyrolized and removed at a vacuum drying temperature in a range of 250 to 400° C. when the binder composition may be used for a negative electrode.

Other Additives

In order to improve additional characteristics, the water soluble binder composition according to the present embodiments may include additional additives as well as the water soluble polymer binder.

Examples of the additional additives include a dispersant, a thickener, a conductive agent and a filler.

In certain embodiments, the respective additives may be mixed with the binder composition in advance to then be used. Alternatively, the respective additives may be separately prepared and then independently used.

Components of the additives to be used are determined according to the active material and binder used. In some cases, the additives may not be used.

In certain embodiments, the amount of each of the additives may vary according to the kind of active material, components of binder and the kind of additive. In certain embodiments, the additives may be present in an amount of 0.1 to 10 wt % relative to the weight of the binder composition, excluding the solvent. If the amount of the additive is less than 0.1 wt %, the addition effect of the additive is not high enough. If the amount of the additive exceeds 10 wt %, the proportion of the binder based on the amount of the binder composition for forming a negative electrode is reduced preventing desired characteristics from being attained.

In certain embodiments, the dispersant may be selected from a material capable of improving dispersibility of a positive or negate active material and a conductive agent in the slurry. In certain embodiments, the dispersant may be selected from a cationic, anionic, and nonionic dispersants. Examples of the dispersant include at least one selected from the group consisting of hydrocarbons having 5-20 carbon atoms in a lipophilic portion, acryl oligomer, ethylene oxide oligomer, propylene oxide oligomer, ethylene oxide and propylene oxide oligomer, and urethane oligomer.

In certain embodiments, the thickener facilitates coating of slurry on a current collector when the slurry has low viscosity. Examples of the thickener include at least one component selected from the group consisting of carboxymethyl cellulose, carboxyethyl cellulose, ethyl cellulose, hydroxymethyl cellulose, hydroxyethyl cellulose, hydroxypropyl cellulose, and polyvinylalcohol.

In certain embodiments, the dispersant and the thickener may be mostly pyrolyzed at a vacuum drying temperature in a range of 250° C. to 450° C. to be removed. Thus, the dispersant and the thickener may be used in small amounts only when necessary.

In certain embodiments, the conductive agent may be a component for improving a conductive path of an electrode and is used to impart conductivity to the conductive agent. Any electronically conductive material can be used as the conductive agent unless it causes a chemical change to the battery, and examples thereof include at least one conductive material selected from the group consisting of natural graphite, artificial graphite, carbon nanofiber, carbon black, acetylene black, ketjen, copper, nickel, aluminum or silver metal powder.

In certain embodiments, the filler may be an auxiliary component for suppressing electrode expansion by improving the strength of the binder, and examples thereof include at least one fibrous material selected from the group consisting of glass fiber, carbon fiber and metal fiber.

Solvent

Water is most preferred as the solvent of the binder composition. In certain embodiments, at least one solvent may be selected from the group consisting of N,N-dimethylformamide, N,N-dimethylacetamide, methylethylketone, cyclohexanone, ethyl acetate, butyl acetate, cellosolveacetate, propyleneglycol monomethylether acetate, methylcellosolve, butylcellosolve, methylcarbitol, butylcarbitol, propyleneglycol monomethylether, diethyleneglycol dimethylether, toluene, and xylene.

The content of the solvent is not particularly restricted as long as the solvent can appropriately adjust the viscosity of slurry.

Preparation of Electrode Active Material Slurry

An electrode active material slurry may be prepared by mixing the binder composition for forming an electrode with the components.

In certain embodiments, a lithiated intercalation compound capable of reversibly intercalating and deintercalating lithium may be used as the active material when the electrode is a positive electrode.

Specific examples of the lithiated intercalation compound include, but are not limited to, lithium cobalt oxide ($LiCoO_2$); lithium nickel oxide ($LiNiO_2$); lithium manganese oxides such as compounds of Formula $Li_{1+x}Mn_{2-x}O_4$ ($0 \le x \le 0.33$), $LiMnO_3$, $LiMn_2O_3$ and $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxides such as $V_2O_5$; Ni-site type lithiated nickel oxides of Formula $LiNi_{1-x}M_xO_2$ (M=Co, Mn, Al, Cu, Fe, Mg, B or Ga, and $0.01 \le x \le 0.3$); lithium manganese composite oxides of Formula $LiMn_{2-x}M_xO_2$ (M=Co, Ni, Fe, Cr, Zn or Ta, and $0.01 \le x \le 0.1$) or Formula $Li_2Mn_3MO_8$ (M=Fe, Co, Ni, Cu or Zn); $LiMn_2O_4$ wherein a portion of Li is substituted with alkaline earth metal ions; disulfide compounds; and iron molybdenum oxide($Fe_2(MoO_4)_3$), etc.

In certain embodiments, crystalline carbon, amorphous carbon or a combination thereof may be used as the active material when the electrode is a negative electrode.

Examples of the crystalline carbon are amorphous, plate-type, flake-type, globular, or fibrous natural or artificial graphite. Examples of the amorphous carbon are soft carbon (carbon sintered at low temperature), hard carbon (carbon sintered at high temperature), mesophase pitch carbide, or sintered cokes. Preferably, the negative active material is selected from the group consisting of Si, $SiO_x$ ($0 < x < 2$), Sn, $SnO_2$, or Si containing metal alloys, and mixtures thereof.

Examples of the metal capable of forming the Si alloys may include at least one selected from the group consisting of Al, Sn, Ag, Fe, Bi, Mg, Zn, in, Ge, Pb and Ti.

Manufacture of Electrode

In certain embodiments, the slurry may be prepared using the binder composition as disclosed and described herein and an electrode active material may be coated on a current collector, heated and dried under vacuum to form an electrode active material layer.

In certain embodiments, the coating of the slurry may be performed by screen printing, spray coating, coating using a doctor blade, gravure coating, deep coating, silk screening, painting, or coating using a slot die, according to the viscosity of slurry.

In certain embodiments, the current collector may be fabricated to have a thickness of 3 to 500 μm. There is no particular limit to the current collector, so long as it has suitable conductivity without causing chemical changes in the manufactured battery. Examples of the current collector include, but are not limited to, copper, stainless steel, aluminum, nickel, titanium, sintered carbon, copper or stainless steel having a surface treated with carbon, nickel, titanium or silver, and aluminum-cadmium alloys.

In certain embodiments, the current collector may be processed to form fine irregularities on the surface thereof so as to enhance adhesive strength to the electrode active material. In certain embodiments, the current collector may be used in various forms including films, sheets, foils, nets, porous structures, foams and non-woven fabrics.

In certain embodiments, the slurry may be coated on the current collector to then be subjected to drying. In the drying, first heat treatment may be performed at a temperature of 80 to 120° C. to evaporate the solvent (water or organic solvent) in the composition for forming a negative active material layer.

If the temperature of the first heat treatment is lower than 80° C., it is difficult to remove the solvent, such as, water, from the electrode. If the temperature of the first heat treatment is higher than 120° C., the solvent, such as, water, is rapidly evaporated, which may generate bubbles on a surface of the electrode and reduce uniformity of the electrode surface.

In certain embodiments, the drying may be performed in an atmospheric environment.

After the solvent in the composition coated on the current collector by the first heat treatment is completely evaporated, second heat treatment may be performed under vacuum.

In certain embodiments, the second heat treatment may be performed at a temperature of 250 to 450° C. under vacuum of $1 \times 10^{-4}$ to $1 \times 10^{-6}$ torr.

Manufacture of Rechargeable Battery

In certain embodiments, the rechargeable battery may include negative and positive electrodes, a separator, and a lithium salt containing nonaqueous electrolyte.

Hereinafter, a rechargeable battery including a negative electrode will be described in detail.

Referring to FIG. 1, the lithium rechargeable battery according to an aspect of the present embodiments may include a can 10, an electrode assembly 20, a cap assembly 30 and an electrolyte. In certain embodiments, the lithium rechargeable battery may be manufactured by accommodating the electrode assembly 20 and the electrolyte in the can 10 and sealing a top end of the can 10 by the cap assembly 30.

The electrode assembly 20 includes a positive electrode 21, a negative electrode 23 and a separator 22. In certain embodiments, the electrode assembly 20 may be fabricated by sequentially stacking the positive electrode 21, the separator 22, the negative electrode 23 and the separator 22 and winding the stacked structure.

In certain embodiments, the cap assembly 30 may include a cap plate 40, an insulation plate 50, a terminal plate 60 and an electrode terminal 80. In certain embodiments, the cap assembly 30 is coupled to an insulation case 70 to seal the can 10.

In certain embodiments, the electrode terminal 80 is inserted into a terminal throughhole 41 formed at the center of the cap plate 40. In certain embodiments, a tubular gasket 46 disposed on the outer surface of the electrode terminal 80 is coupled to the electrode terminal 80 and inserted together when the electrode terminal 80 is inserted into the terminal throughhole 41. Therefore, the electrode terminal 80 may be electrically insulated from the cap plate 40.

In certain embodiments, the electrolyte may be injected into the can 10 through an electrolyte injection hole 42 after the cap assembly 30 is assembled to the top end of the can 10. In certain embodiments, the electrolyte injection hole 42 may be sealed by a separate plug 43. In certain embodiments, the electrode terminal 80 may be connected to a negative electrode tab 17 of the negative electrode 23 or to a positive electrode tab 16 of the positive electrode 21 and may function as a negative electrode terminal or a positive electrode terminal.

In certain embodiments, the lithium rechargeable battery may be manufactured in various shapes, including a cylinder shape and a pouch shape, other than the prismatic shape illustrated herein.

In certain embodiments, the a separator may be interposed between the positive electrode and the negative electrode. As the separator, an insulating thin film having high ion permeability and mechanical strength may be used. In certain embodiments, the separator may have a pore diameter of 0.01 to 10 μm and a thickness of 5 to 300 μm. As the separator, sheets or non-woven fabrics made of an olefin polymer such as polypropylene and/or a glass fiber or polyethylene, which have chemical resistance and hydrophobicity, may be used. In certain embodiments, the solid electrolyte may also serve as both the separator and electrolyte when a solid electrolyte such as a polymer is employed as the electrolyte.

Specific examples of the olefin polymer used as the separator include polyethylene, polypropylene, polytetrafluoroethylene (PTFE), a multi-layered structure having two or more layers of these materials, a composite multi-layered structure such as a polyethylene/polypropylene two layered separator, a polyethylene/polypropylene/polyethylene three layered separator, or a polypropylene/polyethylene/polypropylene three layered separator.

In certain embodiments, the lithium salt-containing non-aqueous electrolyte may be composed of a non-aqueous electrolyte and a lithium salt. As the non-aqueous electrolyte, an organic solvent, an organic solid electrolyte or an inorganic solid electrolyte may be used.

Examples of the nonaqueous electrolyte include aprotic organic solvents such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3L_1$, $CF_3SO_3Li$, $(CF_3SO_2)_2NLi$, chloroborane lithium, lower aliphatic carboxylic acid lithium, lithium tetraphenyl borate and imide. Additionally, components may be included in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

Preparation of Water Soluble Binder Composition

Preparation Example 1

A1

To a dried reaction vessel were added 2.0 g (10 mmol) of 4,4'-oxydianiline, 1.16 g (10 mmol) of 1,6-hexanediamine, 2.02 g (20 mmol) of triethylamine, and 100 mL of N,N-dimethylacetamide (DMAc) under nitrogen ($N_2$) gas with stifling. Subsequently, the reaction vessel was cooled to a temperature of 0° C. using a water/ice bath and maintained at 0° C. The cooled mixture was treated with 4.21 g (20 mmol) of trimelitic acid chloride and stirring for 30 minutes. Then, the water/ice bath was removed to allow the temperature of the reaction vessel to reach room temperature, followed by stirring for 6 hours, thereby preparing a viscous product.

The viscous product was slowly poured to into a container including 2 L of a 0.1 M HCl solution maintained at 0° C. using a water/ice bath while stirring to give a precipitate, followed by vigorously mixing of the resultant product for one more hour to afford a precipitate.

The precipitate was washed using a 0.01M HCl solution while filtering, followed by washing using pure water and drying in a vacuum drying oven at 90° C. for 3 hours.

To a sealed vessel 2.5 g of the dried product and 47.5 g of a 0.05M $NH_4OH$ solution were added and then the vessel was shaken at 70° C. for one hour, thereby affording an aqueous polymer binder solution having a water soluble polymer binder as represented by Formula 4 with 5% solid dissolved in water.

The dried product was analyzed by gel permeation chromatography (GPC) and the prepared polymer binder represented by Formula 4 had a weight average molecular weight of 143,000 g/mol, MWD=1.6354 g/eq. In Formula 4, x and y indicate molar ratios in the reaction, that is, x=0.5 and y=0.5.

Formula 4

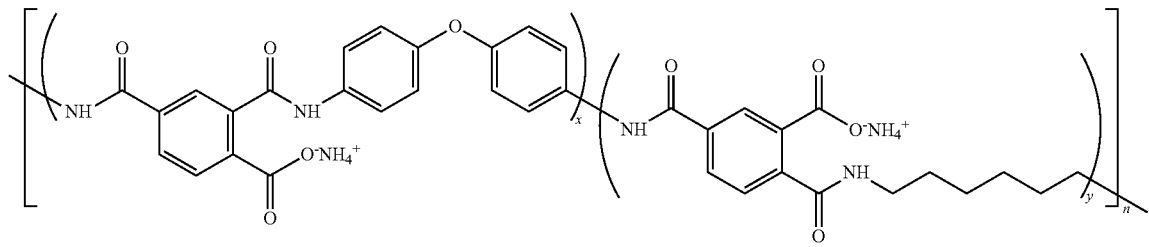

Preparation Example 2

A2

An aqueous polymer binder solution having a water soluble polymer binder with 5% solid dissolved in water, as represented by Formula 5, was prepared in the same manner as in Preparation Example 1, except that 2.16 g (20 mmole) of para-phenylenediamine was used, instead of 4,4'-oxydianiline and 1,6-hexanediamine. The dried product was analyzed by GPC and the prepared polymer binder represented by Formula 5 had a weight average molecular weight of 184,000 g/mol, MWD=1.6 g/eq.

Formula 5

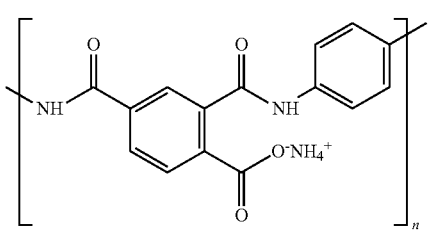

Preparation Example 3

A3

An aqueous polymer binder solution having a water soluble polymer binder with 5% solid dissolved in water, as represented by Formula 6, was prepared in the same manner as in Preparation Example 1, except that 4.0 g (20 mmole) of 4,4'-oxydianiline was used, instead of 4,4'-oxydianiline and 1,6-hexanediamine, and 2.11 g (10 mmol) of trimelitic acid chloride and 3.22 g (10 mmole) of 3,3',4,4'-benzophenonetetradicarboxylic aciddianhydride were used, instead of 4.21 g (20 mmol) of trimelitic acid chloride. The dried product was analyzed by GPC and the prepared polymer binder represented by Formula 6 had a weight average molecular weight of 168,000 g/mol, MWD=1.6 g/eq. In Formula 6, x and y indicate molar ratios in the reaction, that is, x=0.5 and y=0.5.

Formula 6

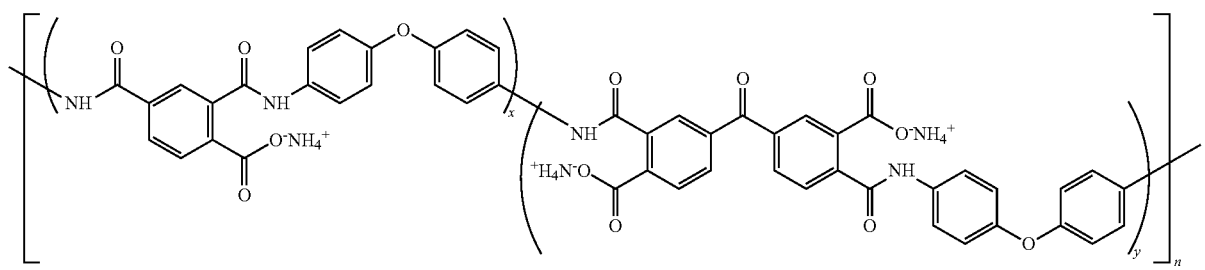

Comparative Preparation Examples 1-3

B1-B3

An organic solvent type polymer binder solution with 5% solid was prepared in substantially the same manner as in Preparation Example 1, except that 2.5 g of powder was dissolved in 47.5 g of N-methylpyrrolidone (NMP), the powder prepared by washing the precipitate using a 0.01M HCl solution, additionally washing using water and then drying in a vacuum drying oven at 90° C. for 3 hours (Comparative Preparation Example 1). Organic solvent type polymer binder solutions with 5% solid dissolved in an organic solvent were prepared in substantially the same manner as in Preparation Example 1, except that the dried powder as intermediate products of Preparation Examples 2 and 3 (Comparative Preparation Examples 2 and 3).

Manufacture of Rechargeable Battery

Example 1

Preparation of Positive Electrode Slurry

A positive electrode slurry was prepared in a slurry synthesis container using 10.0 g of the aqueous polymer binder solution with 5% solid, as represented by Formula 4, prepared in Preparation Example 1, 24.0 g of $LiCoO_2$ as a positive electrode active material (having an average particle diameter of 6.4 μm and a specific surface area of 0.68 $m^2$/g), and 0.5 g of carbon nanofiber (CNF) as a conductive agent (having a fiber length of 10 to 20 μm, a fiber diameter of 160 nm, and a specific surface area of 15 m²/g). In preparing the slurry, water was added to adjust the viscosity of slurry.

Manufacture of Positive Electrode Half Cell

The positive electrode slurry composition was coated on an aluminum (Al) foil and dried at 110° C. for 30 minutes. Then, in order to fabricate a coin-type cell, the resultant product was subjected to punching, pressing and welding, followed by additionally vacuum-drying in a vacuum oven at 350° C. for one hour, affording a positive electrode.

A half cell of a lithium rechargeable battery was manufactured using the positive electrode and Li metal as a counter electrode. Here, 1M $LiPF_6$ dissolved in a mixed solution of ethylene carbonate and diethylene carbonate in a volume ratio of 1:1 was used as an electrolyte.

Example 2

Preparation of Negative Electrode Slurry

A negative electrode slurry was prepared in a slurry synthesis container using 20.0 g of the aqueous polymer binder solution with 5% solid, as represented by Formula 5, prepared in Preparation Example 2, and 19.0 g of mixed powder consisting of Si alloy 12 g, graphite 6 g, and ketjen black 1 g as conductive material. In preparing the slurry, water was added to adjust the viscosity of slurry.

Manufacture of Negative Electrode Half Cell

The negative electrode slurry composition was coated on a copper (Cu) foil and dried at 110° C. for 30 minutes. Then, in order to fabricate a coin-type cell, the resultant product was subjected to punching, pressing and welding, followed by additionally vacuum-drying in a vacuum oven at 350° C. for one hour, affording a negative electrode.

A half cell of a lithium rechargeable battery was manufactured using the negative electrode and Li metal as a counter electrode. Here, 1M $LiPF_6$ dissolved in a mixed solution of ethylene carbonate and diethylene carbonate in a volume ratio of 1:1 was used as an electrolyte. The cell was assembled in a glove box filled with argon gas. After the cell was assembled, battery performance was evaluated using a 100 mA charge/discharge device.

Example 3

A negative electrode half cell was manufactured in substantially the same manner as in Example 2, except that the aqueous polymer binder solution represented by Formula 6, prepared in Preparation Example 3, was used, instead of the aqueous polymer binder solution represented by Formula 5, prepared in Preparation Example 2.

Comparative Example 1

Preparation of Comparative Slurry for Positive Electrode

A comparative slurry for a positive electrode was prepared in substantially the same manner as in Example 1, except that the organic solvent type polymer binder with 5% solid dissolved in NMP, prepared in Comparative Preparation Example 1, was used, instead of the aqueous polymer binder solution prepared in Preparation Example 1. Here, the viscosity of the slurry was adjusted using NMP.

Manufacture of Comparative Battery for Positive Electrode

A half cell of a lithium rechargeable battery was manufactured in substantially the same manner as in Example 1, except that the comparative slurry for a positive electrode prepared in Comparative Example 1 was used, instead of the positive electrode slurry prepared in Example 1.

Comparative Example 2

Preparation of Comparative Slurry for Negative Electrode

A comparative slurry for a negative electrode was prepared in substantially the same manner as in Example 2, except that the organic solvent type polymer binder with 5% solid dissolved in NMP, prepared in Comparative Preparation Example 2, was used, instead of the aqueous polymer binder solution represented by Formula 5, prepared in Preparation Example 2. Here, the viscosity of the slurry was adjusted using NMP.

Manufacture of Comparative Battery for Negative Electrode

A half cell of a lithium rechargeable battery was manufactured in substantially the same manner as in Example 2, except that the comparative slurry for a negative electrode prepared in Comparative Example 2 was used, instead of the negative electrode slurry prepared in Example 2.

Comparative Example 3

A comparative slurry for a negative electrode was prepared in substantially the same manner as in Example 2, except that the organic solvent type polymer binder with 5% solid dissolved in NMP, prepared in Comparative Preparation Example 3, was used, instead of the aqueous polymer binder solution represented by Formula 5, prepared in Preparation Example 2. Here, the viscosity of the slurry was adjusted using NMP.

Experimental Example 1

Evaluation of Positive Electrode

In order to evaluate battery performance of the cells manufactured in the Examples and Comparative Examples, the manufactured cells were fully charged at a charge rate of 0.5 C under constant current and constant current conditions with a cutoff voltage of 4.2 V and then discharged with a constant current at the same rate as in the charging operation to reach a voltage of 3.0 V. This cycle was repeated 50 times to evaluate charge/discharge cycle characteristics. In order to achieve more accurate evaluation, 4 test cells with the same conditions were evaluated at the same time and the results are shown in Table 1.

TABLE 1

| | Initial Discharge Capacity (mAh/g) | Initial Discharge Capacity Retention (@ 50 cycles) (%) |
|---|---|---|
| Example 1 | 133 | 98% |
| Comparative Example 1 | 134 | 98% |

As shown in Table 1, battery performance of the electrode of Example 1 using the water soluble polymer binder was substantially the same as that of the electrode of Comparative Example 1 using the binder dissolved in the organic solvent. This suggests that the organic solvent type binder and the water soluble binder prepared by converting the organic solvent type binder into a water soluble binder ultimately demonstrate similar binder characteristics. Therefore, it is proposed that the water soluble polymer binder composition according to the present embodiments may be environmentally friendly and may be directly applied to a water-based process.

Experimental Example 2

Evaluation of Negative Electrode

In order to evaluate battery performance of the cells manufactured in Examples and Comparative Examples, the manufactured cells for battery test were fully charged at room temperature (25° C.) at a charge rate of 0.5 C under constant current and constant current conditions with a cutoff voltage of 0.5 V and then discharged with a constant current at the same rate as in the charging operation to reach a voltage of 1.5 V. This cycle was repeated 50 times to evaluate charge/discharge cycle characteristics. In order to provide a more complete evaluation, 4 test cells with the same conditions were evaluated at the same time, the results are shown in Table 2.

TABLE 2

|  | Initial Discharge Capacity (mAh/g) | Initial Discharge Capacity Retention (@ 50 cycles) (%) |
| --- | --- | --- |
| Example 2 | 1256 | 90% |
| Comparative Example 2 | 1254 | 89% |
| Example 3 | 1234 | 93% |
| Comparative Example 3 | 1233 | 93% |

As shown in Table 2, the negative electrodes of Examples 2-3 and Comparative Examples 2-3 demonstrated substantially similar results. That is to say, it was confirmed that the organic solvent type binder and the water soluble binder prepared by converting the organic solvent type binder had similar binder characteristics.

Although the present embodiments have been described with reference to certain exemplary embodiments thereof, it will be understood by those skilled in the art that a variety of modifications and variations may be made without departing from the spirit or scope of the present disclosure as set forth in the following claims.

What is claimed is:

1. A water soluble binder composition for an electrode comprising a polymer binder having at least one amide group and at least one carboxylate group in repeating units of the polymer, wherein the polymer binder includes at least one polymer repeating unit represented by Formulas 1 to 3:

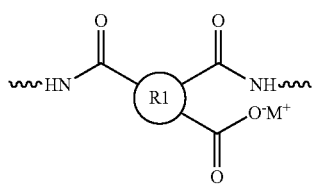

Formula 1

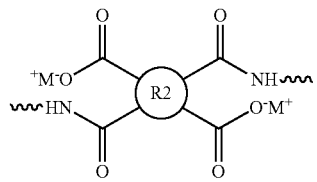

Formula 2

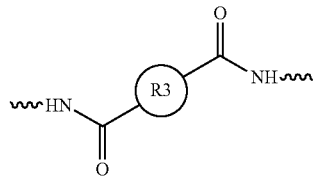

Formula 3 wherein:

R1 includes an aromatic ring and optionally includes oxygen, sulfur or nitrogen provided within the aromatic ring or between aromatic rings;

R2 includes an aromatic ring and optionally includes oxygen, sulfur or nitrogen provided within the aromatic ring or between aromatic rings and is substituted or unsubstituted by one or more halogen atoms;

R3 is a linear or branched C1-C12 saturated or unsaturated hydrocarbon, C3-C12 saturated or unsaturated cyclic hydrocarbon, or aromatic C6-C12 hydrocarbon or a combination thereof having at least one of a linear or branched C1-C12 saturated or unsaturated hydrocarbon, carbonyl, oxy, carbonyloxy, aminocarbonyl, aminosulfonyl, sulfinyl, sulfinyl, sulfonyl, sulfonyloxy, or imino-; and M is an alkaline metal, an alkaline earth metal or a protonated amine compound.

2. The water soluble binder composition of claim 1, wherein R1 includes a core selected from the group consisting of

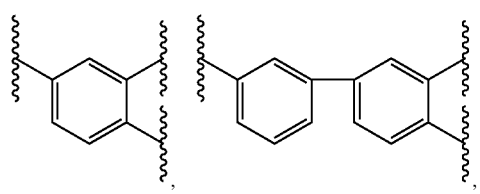

,

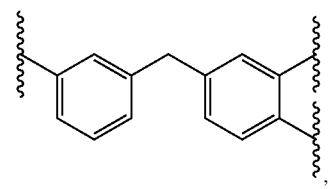

,

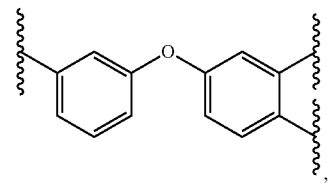

,

-continued

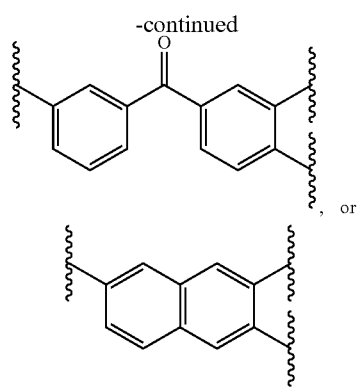

, or

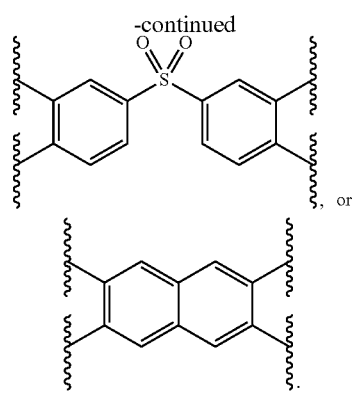

, or

.

.

3. The water soluble binder composition of claim 1, wherein R2 includes a core selected from the group consisting of

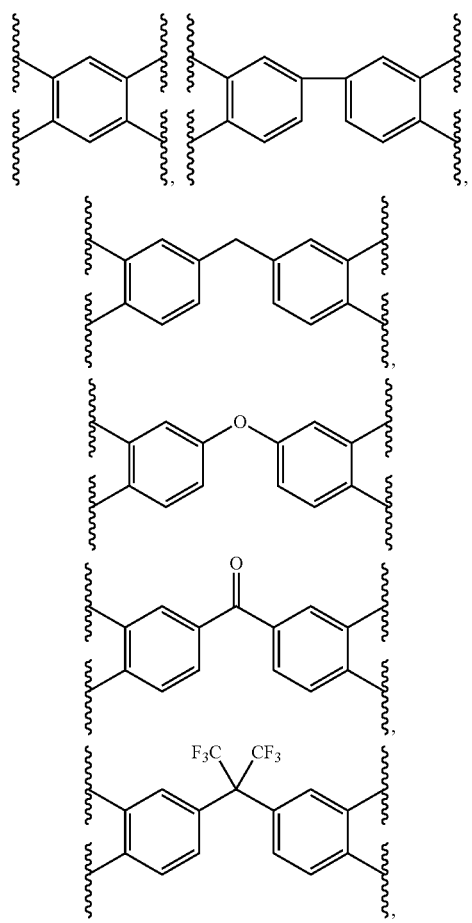

4. The water soluble binder composition of claim 1, wherein M is a protonated amine compound where the protonated amine compound includes at least one primary, secondary or tertiary amine compound selected from the group consisting of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine and triethanolamine.

5. The water soluble binder composition of claim 1, wherein the polymer binder is a mixture of two or more kinds of polymer binders or a mixture of polymer binders of the same kind having different molecular weights.

6. The water soluble binder composition of claim 1, further comprising one or more other water soluble binders as an auxiliary binder in addition to the polymer binder.

7. The water soluble binder composition of claim 6, wherein the auxiliary binder includes polyvinyl alcohol, polyacrylic acid, polymethacrylic acid, polyacrylic acid copolymer, polymethacrylic acid copolymer, polyacrylamide, copolymer, (modified) butadiene rubber emulsion, (modified) styrene-butadiene rubber emulsion and (modified) urethane rubber emulsion.

8. The water soluble binder composition of claim 1, further comprising at least one additive selected from the group consisting of a dispersant, a thickener, a conductive agent and a filler.

9. The water soluble binder composition of claim 1, wherein the polymer binder is present in an amount of 50 to 100 wt % based on the total weight of the water soluble binder composition.

10. The water soluble binder composition of claim 1, wherein the electrode is a negative electrode.

11. A lithium rechargeable battery comprising a positive electrode, a negative electrode, a separator, and an electrolyte, wherein at least one of the positive electrode and the negative electrode is the electrode prepared by using the water soluble binder composition of claim 1.

* * * * *